United States Patent Office 3,651,211
Patented Mar. 21, 1972

3,651,211
VIRUS INACTIVATION
William C. Gillchriest and William A. Brewer, Los Angeles, Calif., assignors to Lockheed Aircraft Corporation, Los Angeles, Calif.
No Drawing. Filed Oct. 16, 1967, Ser. No. 675,281
Int. Cl. A61k *23/00;* C12k *7/00*
U.S. Cl. 424—89                                4 Claims

ABSTRACT OF THE DISCLOSURE

A chemical method is provided by which living viruses are biologically deactivated and thereafter restored to activity when desired. A sulfhydryl reagent is introduced to a critical site in the viral phospholipoprotein coat to arrest the activity of the organism. To restore biological activity, an appropriate metal atom is introduced to the site which competes with the sulfide for sulfide ions and thereby restores the protein coat to its original state.

BACKGROUND OF THE INVENTION

Controlled temporary inactivation of viruses will permit extended storage, safe transportation (as by aircraft), or selective control through certain process steps in the manufacture of pharmaceuticals. Deactivation and reactivation comprises separate chemical methods for controlling the activity of these potentially dangerous ultramicroscopic organisms.

DESCRIPTION OF THE PRIOR ART

The handling and transportation of live viruses is necessary in a number of fields including medical research and commercial manufacture of immunization serums. Inasmuch as no means have been available, heretofore, for reversible controlling the biological activity of such viruses, elaborate precautions have been taken to safeguard their transport and to prevent environmental contamination. While it has been known that viruses may be biologically inactivated by various means, such inactivation has not, heretofore, been reversible. The inability to reactivate the previously inactivated viruses has imposed serious limitations on the ability to safely transport or otherwise handle such materials.

SUMMARY OF THE INVENTION

Insight has been gained into a critical reaction of the protein coating of viruses. The protein coat contains a cysteine residue which is exposed or becomes exposed as a result of a reaction with sodium sulfide (or a sulfhydryl reagent) at an alkaline pH. The oxidation from S—H or S⁻ to S—S is critical in that the S—H or S⁻ is essential for biological activity. That is, the critical site in the protein is a cysteine amino acid residue.

Analogous reversible reactions are well known, but heretofore have not been extended to living viruses. Some sulfide-containing enzymes, such as ribonuclease, and TMV-protein, may be reversibly oxidized and reduced through the cysteine amino acid residue. Aeration is sufficient to produce such oxidation in ribonuclease and lysozyme. These enzymes are active in the S—S or oxidized forms, whereas they are inactive in their reduced or —SH or —SM forms.

The invention may be demonstrated by means of the Sindbis virus (Sv) which may be inactivated with sodium sulfide at pH 8.0 and reactivated with $Co^{++}$, $Pb^{+++}$ or $Zn^{++}$. Other examples will also be described.

DESCRIPTION OF THE PREFERRED EMBODIMENTS

As has been indicated hereinabove, certain viruses can be inactivated and reactivated biologically by chemical means. A complete theory explaining all of the salient features of this discovery has not yet been formulated. However, a number of standardized and reproducible examples encompassing this discovery have been investigated, and the results thereof demonstrate the new and useful features of the invention which may be advantageously utilized by those skilled in the art.

EXAMPLE I.—SINDBIS VIRUS

The Sindbis virus is prepared in a standard tissue culture identified as 48-hour chicken embryo fibroblast monolayer (CEFM), obtained from nine to ten day old chick embryos. The test organism is Sindbis virus W 9482 obtained from the American Type Culture Collection, 12301 Parklawn Drive, Rockville, Md. 20852. All laboratory glassware is carefully cleaned and sterilized. Actual tissue cultures are placed in 60 x 15 Falcon plastic Petri dishes and incubated in a conventional manner. Activity measurement by plaque assay is compared against a control. Logarithmic dilution tubes, which have been carefully sterilized by autoclaving are used in plaquing.

Chemical treatment of the virus is accomplished by means of analyzed reaction grade chemicals dissolved in distilled deionized water in volumes greater than 3:1. Deionization is accomplished by Culligan deionizing resins. The deactivating reagent comprises a hundredth molar solution (0.1 M) of $Na_2S$. Entrapped $O_2$ in the water solution is removed by purging with $N_2$. The pH is adjusted to be within the range of 7.2 to 12. The low cutoff for Sindbis has been found to be 7.2.

Sodium sulfide at pH 8.0 completely inactivates the Sindbis virus. However, compounds such as sulfite, cysteine, polysulfide, or reduced glutathione do not inactivate Sindbis virus at pH 8.0. The 48-hour CEFM tissue culture is used to assay the activity or inactivtiy of the Sindbis virus. All of the oxygen in the system is removed leaving the S⁻. The inactivated viruses may be stored indefinitely. Quantitative estimates of plaque forming units of Sindbis virus are established by plating 0.1 and 0.2 ml. aliquots onto CEFM, containing approximately $10^7$ fibroblasts per plate. The 48-hour virus infected tissue cultures are overlaid with 5 ml. of 5% neutral red bactoagar solution for assaying, and the plaques are counted after 4 to 6 hours. The delay time in plaque count is the time required for the neutral red indicator at pH 7.5 to diffuse through the agar and stain the metabolizing CEFM. The virus infected cells do not metabolize and thus do not take up the neutral red stain.

When desired, the previously inactivated Sindbis S may be reactivated with $Co^{++}$, $Pb^{+++}$ or $Zn^{++}$. It has been found that Sindbis S cannot be reactivated with Ag or Hg in their nitrate forms. This activity correlates well with the antibody neutralization of Sindbis virus biological activity. For example, a residual fraction due to virus aggregation is always left that cannot be neutralized. This and the sulfide inactivation and reactivation with metal ions that will compete with sulfide for sulfide ions produces a reactivation greater than the original, may be expressed as follows:

$$Sv + Sv \rightleftharpoons Sv—S—S—Sv$$

Sv → active form or reduced form

Sv S—Sv → inactive or oxidized form

SvS=inactive or oxidized form $$Sv + Na_2S \underset{}{\overset{pH8.0}{\rightleftharpoons}} Sv\ S$$

To examine the $$Sv + Na_2S \underset{}{\overset{pH8.0}{\rightleftharpoons}} Sv\ S$$

and $\qquad Sv + O_2 \rightleftharpoons Sv\ S—S\ Sv$ the virus solution was deaerated by $N_2$ flushing. Under non-oxidizing conditions, $Na_2S$ treatment does not inactivate Sindbis virus at pH 8.0 and the normal biological decay in $O_2$ saturated solutions stops. Upon resaturating the solutions with $O_2$ or air, $Na_2S$ treatment at pH 8.0 again inactivates the virus particle and normal $O_2$ saturated solution decay of Sindbis activity continues. Emulsifying SvS in mercury does not reactivate Sindbis to the Sv form.

EXAMPLE II.—SINDBIS VIRUS REACTIVATION WITH IRON

The pH of the culture is adjusted to 11–12 with KOH and deaerated (deoxygenated) with $N_2$ or $$Ar \cdot FeSO_4 \cdot XH_2O$$

is added to the deoxygenated alkaline Sindbis treated solution (i.e., $SvS^{35}$). The oxidation of $Fe^{++}$ to $Fe^{+++}$ by S may split the $SvS^{35}$ to form Sv, which chemical form is essential for Sindbis, Semi-liki Forest and WEE Group A arbor virus activity on the CEFM cultures.

EXAMPLE III.—POLIOMYELITIS VIRUS, TYPE I

Other viruses containing cysteine residues in their coat protein are also capable of being inactivated by the reaction described in Example I; however, not by a specific sulfide reaction but by most of the sulfhydryl reagents. These include sodium bisulfite ($NaHSO_3$), and dimethyl sulfoxide $$(CH_3-S-CH_3)$$
$$\overset{\|}{O}$$

One of the many capabilities of the oxidizing mono and dithiol reagents is that they can convert and maintain S—S (disulfide) sites in polymers to $S^-$ or monothiol sites. This reaction is highly advantageous if the S—S (disulfide) happens to be the chemical biologically inactive form of a given virus or protein and the —$S^-$ happens to be the chemical biologically active form. The pH at which the inactivation is carried out is peculiar to the type of virus used, and in the case of polio virus, Type I, the range is approximately 7, down to approximately 2. Following sulfhydryl reagent inactivation, the polio virus may easily be reactivated with any one of the metal ions $Co^{++}$, $Fe^{+++}$, $Pb^{++}$, or $Zn^{++}$, or by means of a low level redox potential compound as will be described hereinafter.

EXAMPLE IV.—WESTERN EQUINE ENCEPHALITIS (WEE) VIRUS

The WEE virus is grown by inoculation of bottle culture of CEFM. Hyland 199 medium and gamma globulin are utilized for growth and assay purposes. Inactivation is accomplished with a sulhydryl reagent as in the case of the poliomyelitis virus of Example III. The pH is maintained within the range of 7.3–12 at the time of deactivation of the inactivated virus is readily accomplished with any one of the metal ions $Hg^{++}$, $Cu^{++}$, or $Fe^{++}$.

The biological activity of group A arbor viruses and other picorna viruses containing cysteine or other forms of $S^-$ in their protein coat, as the critical site controlling biological activity at the holovirus level of organization, may be reversibly activated from S—S (disulfide) inactive forms and maintained as active form holoviruses $S^-$ (i.e., SH or $Sme^{+h}$) forms by the use of low level redox potential (LLRP) compounds. One such compound is 1,4-dithio-2,3-dihydroxybutane. The LLRP compounds have the natural ability to maintain monothiols completely in the reduced state and to continuously reduce disulfides quantitatively due to their low redox potential (−0.33 volt at pH 7.0). The redox potential changes to more negative values (−0.366 volt at pH 8.1), as the pH changes to higher values. This characteristic of LLRP compounds is used in the present invention to control the biological activity of group A arbor viruses. Other viruses in addition to the group A arbor viruses may be treated with LLRP compounds to control their biological activity, providing the critical biological activity reaction is:

| Bio-inactive | | Bio-active |
|---|---|---|
| VS—SV + 2RSH | $\rightleftharpoons$ | 2VSH + R—S—SR |
| Bio-inactive | | Bio-active |
| VS—S$^-$ + RSH | $\rightleftharpoons$ | VSH + R—S—S$^-$ | and that the viruses are stable in the alkaline pH range.

LLRP compounds are highly soluble in aqueous solutions and exhibit only a small tendency to oxidation directly by the air. They are excellent for reactivating and maintaining critical reduced sites in S—S (disulfide) oxidized (inactivated) viruses and proteins.

SUMMARY

Sodium sulfide is a specific inactivating reagent at alkaline pH values. Sulfhydryl reagents may be used in other instances for inactivation. Thus, the protein coat must contain a cysteine residue or a sulfide ion which is exposed or becomes exposed as a result of the reaction with sodium sulfide at alkaline pH values.

Reactivation may be accomplished by introducing a metal atom to the critical site in the viral coat which competes with the sulfide for sulfide ions, or by means of low level redox compounds.

It is not essential that the inactivated virus be reactivated in order to have a successful storage or transport procedure.. For example, Sindbis virus inactivated according to the invention will yield active ribonucelic acid (RNA) which may be extracted. The Sindbis —RNA (Sv-RNA) will produce whole active virus in appropriate host cells.

While there have been shown specific examples of the novel method of the invention, it is to be understood that the invention is not so limited. The nucleic acid core of a virus is covered with a protein coat. The method of the invention contemplates that there is at least one critical site on this viral coat. Any virus which contains a sulfhydryl group in its coat may be activated or deactivated by appropriate treatment of the critical site. Having described responsive examples, it is believed that those skilled in the art may apply the deactivation/reactivation process of the invention to analogous applications without the exercise of invention. Therefore, it is intended that the invention be limited solely by the following claims.

What we claim is:

1. A composition of matter comprising:
    a living virus having a cysteine amino acid residue at a critical site in its protein coat, said virus being selected from the group consisting of Sindbis virus, Western equine encephalitis virus, and picorna virus;
    a compound selected from the group consisting of sodium sulfide, sodium bisulfite, and dimethyl sulfoxide; and
    a basic buffering agent in a concentration sufficient to establish a pH in the range from 7.2 to 12 for said composition.

2. The process of inactivating the biological activity of a selected type of virus, the protein coat of which contains a cysteine amino acid residue having a reactive site at the S—H or S— portion of said residue, comprising the steps of:
    buffering an aqueous solution of a compound selected from the group consisting of sodium sulfide, sodium bisulfite, and dimethyl sulfoxide with an alkaline reagent to result in a pH in the range from 7.2 to 12; and
    contacting the reactive site of a virus selected from the group consisting of Sindbis virus, Western equine encephalitis virus, and picorna virus with said buffered solution, thereby inactivating the biological activity of the selected virus.

3. The process of inactivating the biological activity of poliomyelitis virus, Type I, the protein coat of which contains a cysteine amino acid residue having a reactive site, comprising the steps of:
  buffering an aqueous solution of a compound selected from the group consisting of sodium bisulfite and dimethyl sulfoxide with a buffering reagent to result in a pH of said solution in the range from 2 to 7; and
  contacting said reactive site with said buffered solution, thereby inactivating the biological activity of said virus.

4. A composition of matter comprising:
  a living poliomyelitis virus, Type I, having a cysteine amino acid residue at a critical site in its protein coat;
  a compound selected from the group consisting of sodium bisulfite and dimethyl sulfoxide; and
  a buffering agent in a concentration sufficient to establish a pH in the range from 2 to 7 for said composition.

References Cited
UNITED STATES PATENTS 3,128,231    4/1964    Melnick et al. _____ 167—78

OTHER REFERENCES

The Viruses, Burnet et al., Academic Press, pp. 417–18 (1959).

Merck Index, p. 373, 1960.

SAM ROSEN, Primary Examiner

U.S. Cl. X.R.

195—1.1, 1.4